United States Patent [19]

Schulz

[11] Patent Number: 4,868,683
[45] Date of Patent: Sep. 19, 1989

[54] METHOD OF ALIGNING OBJECTS BY DETECTING A REFERENCE PICTURE LINE THEREIN WHICH HAS AN OPTICALLY CHARACTERISTIC PICTURE CONTENT

[75] Inventor: Dieter Schulz, Hanover, Fed. Rep. of Germany

[73] Assignee: Polygram International Holding B.V., Baarn, Netherlands

[21] Appl. No.: 65,537

[22] Filed: Jun. 23, 1987

[30] Foreign Application Priority Data

Jun. 24, 1986 [DE] Fed. Rep. of Germany ....... 3621056

[51] Int. Cl.⁴ .......................... G11B 7/00; H04N 5/00
[52] U.S. Cl. .................................. 358/342; 358/101; 358/107
[58] Field of Search ............... 358/342, 101, 105, 107; 369/43.47

[56] References Cited

U.S. PATENT DOCUMENTS 3,903,363 9/1975 Montone et al. .................... 358/101
4,282,553 8/1981 Wentzel et al. ....................... 360/75

FOREIGN PATENT DOCUMENTS 7638 7/1979 European Pat. Off. .

Primary Examiner—Robert L. Richardson
Attorney, Agent, or Firm—Thomas A. Briody; Jack E. Haken; Anne E. Barschall

[57] ABSTRACT

In a method of aligning objects and in particular, of aligning optically readable disc-shaped information carrier. The objects are preferably optically scanned line-by-line in a direction transverse to their direction of movement. A reference picture line with an optically characteristic picture content is detected to allow alignment relative to known positions. To detect the reference picture line, the picture contents of all the picture lines are compared with each other and the corresponding correlation coefficients are determined. The reference picture line is that picture line whose picture content correlates least with the picture content of any other picture line.

19 Claims, 2 Drawing Sheets

METHOD OF ALIGNING OBJECTS BY DETECTING A REFERENCE PICTURE LINE THEREIN WHICH HAS AN OPTICALLY CHARACTERISTIC PICTURE CONTENT

BACKGROUND OF THE INVENTION

The invention relates to a method of aligning the rotational position of rotatable objects or of positioning translatable objects into a set orientation or position, in particular for aligning optically readable disc-shaped information carriers. The objects are preferably optically scanned line by line in a direction transverse to their direction of movement. After detection of a reference picture line with an optically characteristic picture content, the objects are aligned or positioned.

In engineering it is often required to position or to align objects either for reasons of appearance or for technical reasons. Particularly in automated production or processing operations it is often necessary for an object to have a specific position or orientation. Thus, suitable objects can be positioned by scanning their exterior shape and subsequently bringing them into a specific position. However, this is not always possible. For example, rotationally symmetrical objects cannot be aligned in a specific rotational position by mechanical scanning only. Optical criteria should also be applied.

Known methods of aligning the rotational positions of rotatable objects or for positioning translatable objects based on optical principles, necessitate an optical marking on the object. The objects are then aligned or positioned relative to this optical marking. It is then important that the marking be optically distinct from other parts of the surface of the object. In other words, the marking should bear a minimal resemblance to other parts of the surface of the object. However, this means that the marking used for aligning or positioning the object is distinctly visible. This may not always be desirable; particularly in the case of objects whose physical appearance is important, for example, if for commercial reasons a marking of the type described above must be as inconspicuous as possible. In general, it may even be desirable for such objects to have no specific optical marking provided for the purpose of positioning.

SUMMARY OF THE INVENTION

It is the object of the invention to provide a method of aligning the rotational positions of rotatable objects or for positioning translatable objects, allowing the objects be aligned without the use of markings specifically provided for this purpose and at the same time guaranteeing a most accurate alignment. In addition, the method should be suitable for use with physically similar objects having optically different surfaces.

According to the invention this object is achieved in that the reference picture line with an optically characteristic picture content is detected by comparing the picture contents of all picture lines are compared with one another and determining the associated correlation coefficients are determined. A picture line is used as a reference picture line for positioning or aligning the objects when its picture content correlates to minimal extent with the picture content of any other picture line.

In this method, all the available picture lines are consecutively compared with one another to determine the associated correlation coefficients. Depending on the correlation coefficients that picture line is selected as the optically characteristic picture line whose largest correlation coefficient relative to one of the other pictured lines is smaller than the largest correlation coefficient of any other picture line relative to the other picture lines. Thus, for each picture line the largest coefficient of correlation with one of the other picture lines is determined. These largest correlation coefficients of the various picture lines are then compared with one another. A picture line is selected as the optically characteristic picture line when its largest correlation coefficient relative to one of the other picture lines is smallest. In this way that picture line is found which is optically most distinct from all the other ones and which is therefore best suited for optically aligning or positioning the object.

During every subsequent alignment of a similar object the optically characteristic reference picture line is detected as a reference and subsequently the object is brought into the set position by means of this reference.

The principal advantage of this method is that it does not require any special markings, that is markings provided especially for the purpose of alignment. Further, this method does not require any specific accurately defined marking; objects to be aligned should merely bear a maximal optical similarity to the objects used in determining the reference picture line. This is of particular importance for those objects whose optical function is important. This applies to, for example, optically readable disc-shaped information carriers, such as Compact Discs, whose optical function should not by impaired by additional markings needed for automatic alignment. In addition, when the method in accordance with the invention is used it should not be necessary to make special allowance for the automatic alignment of the information carriers in printing or labelling the information carriers. The method does not depend on a specific optical appearance of the information carrier but can be adapted to the existing labelling of a series of information carriers. Thus the automatic alignment of series of differently labelled information carriers is also comparatively easy.

In a further embodiment of the invention the orientation of each picture line relative to the set position and the picture content of each picture line are stored and the picture content is compared with the picture contents of all the other picture lines, the associated correlation coefficients being determined and stored, so that subsequently for each picture line an associated set of correlation coefficients obtained by comparison with all the other picture lines is stored, for each picture line the largest correlation coefficient of the associated set of correlation coefficients is determined, as the reference picture line that picture line is selected whose largest correlation coefficient is smaller than the largest correlation coefficients of all the other picture lines, during each subsequent alignment of an object the contents of the picture lines are compared with the picture content of the optically characteristic reference picture line, after which these lines and subsequently the nominal positions are determined.

In accordance with this method first of all an arbitrary picture line and is selected from all the available picture lines and stored. In addition, its position relative to the predetermined set position is determined. Subsequently, the picture content of the this stored picture line is compared with the picture contents of all the other picture lines. The associated correlation coefficients are then determined and also stored. Subsequently, a following picture line together with its position is stored and compared with the other picture lines in a similar way. Thus, for each picture line as associated set of correlation coefficients resulting from the comparison of this picture line with all the other picture lines is determined. For each picture line the largest correlation coefficient is selected from the associated set of correlation coefficients. Thus an associated largest correlation coefficient, obtained by comparison with the other largest correlation coefficients of all the picture lines are subsequently compared with one another. Then that picture line is selected whose largest correlation coefficient is smaller then every largest correlation coefficient of the other picture lines. In this way that picture line is found which correlates to the smallest extent with any other picture line. In other words, that picture line is chosen whose largest correlation coefficient relative to the any other picture line is smallest. This picture line is now selected as the reference picture line because it differs very distinctly from all the other picture lines.

Thus, this picture line selected as the optical characteristic reference picture line is always detected for the subsequent alignment of similar objects. Since its position relative to the set position is known, the set position can be determined once the optically characteristic reference picture line has been found.

The alignment operation does not take more time than the known method, where a specific marking is detected. For objects with a different appearance or a different imprint it is merely necessary to detect the optically characteristic picture line. This operation takes a slightly longer time than the alignment operation, but has to be carried out only once for optically similar objects. In particular when a comparatively large series of objects are to aligned this is a minor disadvantage in comparison with the advantage that no additional optical markings are needed and that the objects may be labelled freely.

In a further embodiment of the invention, if during comparison of the picture content of a picture line with the picture contents of the other picture lines a predetermined maximum correlation coefficient is exceeded the two relevant picture lines are rejected as possible reference picture lines and are not stored in the memory to be compared with all the other picture lines.

During comparison of the picture content of a stored picture line with the picture contents of the other lines it is ascertained continually whether the correlation coefficient thus determined exceeds a predetermined maximum correlation coefficient. If this is the case, the two picture lines involved in the comparison are rejected as possible reference picture lines, because they do not differ enough from another and therefore do not qualify as a reference picture lines. This early rejection of such picture lines has the advantage that the search for reference picture lines is shortened considerably, because picture lines which correlate too much with other picture lines are rejected immediately and need no longer be used for further comparisons, thus shortening subsequent comparisons.

In a further embodiment of the invention, if after comparison of the picture content of a picture line with the picture contents of all the other picture lines, a predetermined maximum correlation coefficient is found to be larger than all correlation coefficients found during all said comparisons, the largest correlation coefficient determined during said comparisons is selected as the new maximum correlation coefficient.

If during comparison of the picture content of a stored picture line with the picture contents of all the other picture lines, the predetermined maximum correlation coefficient is formed to be consistently larger, the largest correlation coefficient found during all these comparisons is utilized as the new maximum correlation coefficient. This has the advantage that the maximum correlation coefficient is adapted continually. If the predetermined maximum correlation coefficient is selected to be larger than actually necessary, the maximum correlation coefficient is reduced automatically during the comparison of the picture lines and is thus adapted to the actually prevailing correlation level. This reduction of the maximum correlation coefficient further speeds up the search for the reference picture line, because after a reduction of the maximum correlation coefficient as described above, it is possible to reject more picture lines as optically characteristic picture lines from the very beginning. In a further embodiment of the invention the new maximum correlation coefficient is also replaced in the same way if during a subsequent comparison of the picture content of a line with the picture contents of all the other lines the resulting coefficient is each time found to be larger than the maximum correlation coefficient. Thus, the above method of replacing the maximum correlation coefficient may also be applied during the subsequent comparisons.

In a further embodiment of the invention, the picture lines adjacent to the stored picture line are rejected during comparison of the picture content of a stored picture line with the picture contents of all the other picture lines.

Depending on the desired accuracy and on the nature of the label it may be advantageous not to compare a picture line just stored with the directly adjoining picture lines. For example, if the object exhibits an optical feature covering several picture lines it is obvious that the picture lines will have a comparatively large correlation coefficient relative to each other. Nevertheless it may be useful to select one of these picture lines as the optically characteristic picture line because the contents of these picture lines differ substantially from all the other ones. If during comparison of one of the picture lines the directly adjoining lines are rejected, one of these picture lines may be utilized as the optically characteristic picture line. This line then differs from its direct neighbours to such a small extent that during alignment a specific uncertainty may arise. Therefore, it is necessary to determine the accuracy with which the subsequent alignment is to be effected and how many directly adjoining picture lines are to be ignored during a comparison.

In a further embodiment of the invention during each new alignment of an object of the same type the following quotient is determined as a measure (AS) of the alignment reliability:

$$AS = \frac{K_A - K_{M2A}}{1 - K_{M2S}}$$

where
$K_A$ is the autocorrelation coefficient between the picture contents of the picture line identified as the optically characteristic picture line during alignment and the stored reference picture line, $K_{M2A}$ is the correlation coefficient between the picture content of the picture line identified during alignment as correlating most highly with the stored reference picture line and the picture content of the stored reference picture line, $K_{M2S}$ is the correlation coefficient between the picture content of the stored picture line correlating most highly with the stored reference picture line and the picture content of he stored reference picture line.

During the initial search for the reference picture line, that picture line is sought whose picture content has the highest correlation of all other picture lines with the reference picture line. The correlation coefficient between said picture line and the reference picture line found is also determined. This is the correlation coefficient $K_{M2S}$ in the quotient for determining the alignment reliability AS.

During each alignment two further correlation coefficients are now determined. First the auto-correlation coefficient $K_A$ indicates the extent to which the picture line stored as the reference picture line in the initial search for the reference picture line and the picture line identified as the reference picture line during the subsequent alignment correlate with each other. Moreover, the correlation coefficient $K_{M2A}$ is determined. This coefficient indicates the correlation between the picture contents of the following two picture lines:

1. the picture line which has the highest correlation with the stored reference picture line during alignment, and
2. this reference picture line, which was stored before the beginning of the alignment during the initial search for the reference picture line.

These three correlation coefficients now enable the alignment reliability AS to be determined in conformity with the above formula. This provides a measure of the probability of a correct alignment or every alignment operation. If this alignment reliability fails below a specific value it is likely that either the alignment operation did not proceed correctly or that the labelling of the object to be aligned differs excessively from the labelling of the object used in determining the reference picture line.

In a further embodiment of the invention, alignment is discontinued and/or an error signal is given if the alignment reliability AS falls below a predetermined value. If the alignment realiability AS decreases below a predetermined value it is useful for the above reasons to discontinue alignment and/or to give an error signal. This not only increases the alignment reliability, but it also provides an error signal when the wrong objects or incorrectly labelled objects are to be aligned.

In a further embodiment of the invention optical line-by-line scanning of the objects is effected by means of a suitably selected colour filter. Depending on the frequency spectrum of the labelling of the object or the object itself a colour filter may be used in optical scanning for optically accentuating individual optical elements of a specific colour by contrast enhancement.

BRIEF DESCRIPTION OF THE DRAWING

An embodiment of the invention will now be described in more detail, by way of example, with reference to the accompanying drawings. In the drawings.

DETAILED DESCRIPTION OF THE PREFERRED EMBODIMENTS

Figure 1:
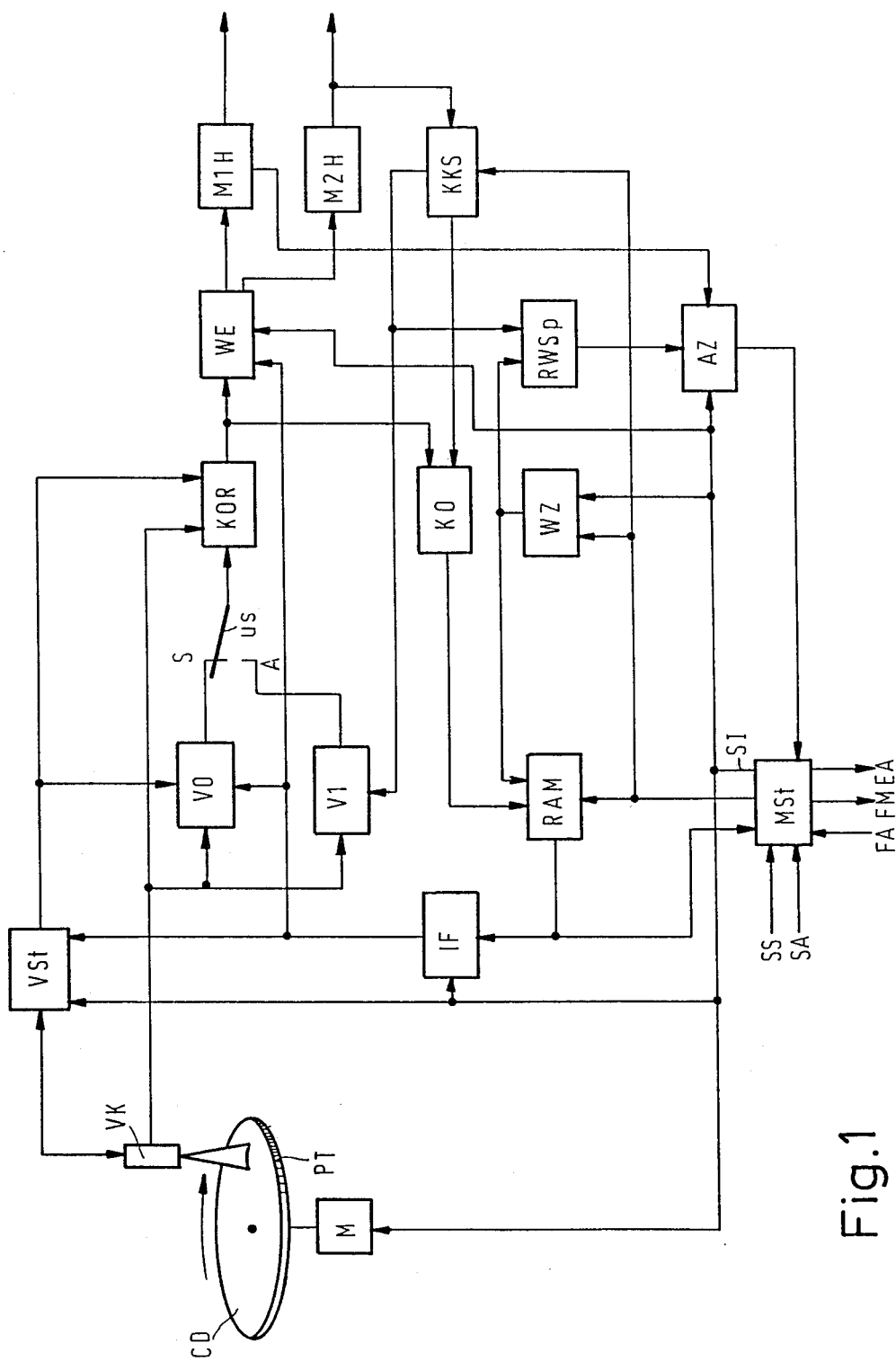
FIG. 1 shows a block diagram of a circuit for aligning Compact Discs.

FIG. 1 is a block diagram of a circuit arrangement which operates in accordance with the inventive method and which aligns Compact Discs in conformity with their labelling.

In principle, the circuit arrangement is controlled by a motor control circuit MSt. For this purpose this motor control circuit MSt receives external control signals and supplies status signals. Specifically, the motor control circuit receives and external start signal SS for starting the search for the optically characteristic picture line and a start signal SA for starting the alignment process. For the subsequent alignment process the motor control circuit further receives an alignment-enable signal FA for each individual Compact Disc to be aligned. The status signals supplied by the motor control circuit comprise an end-of-alignment signal EA to terminate alignment and an error signal FM. For a new series of Compact Discs with a specific label it is first of all necessary to detect the reference picture line with the optically characteristic picture content, i.e. the picture line which optically differs to a maximal extent from all the other picture lines. For this purpose a Compact Disc CD, shown schematically in FIG. 1, is placed in the desired set position on a turntable PT, shown schematically in FIG. 1. This turntable PT can be driven by means of a stepping motor M. If the motor control circuit MSt now receives the search-start signal SS, all the storage locations in a memory RAM are initially set to logic 1. This memory RAM has a number of storage locations equal to the number of angular positions of the Compact Discs CD which can be obtained by means of the stepping motor M. The memory RAM is addressed by means of an angle counter WZ, which must also be set to zero by the motor control circuit MSt at the beginning of the search operation. Further, upon receipt of the signal SS the motor control circuit MSt supplies a desired maximum correlation coefficient to a circuit KKS, which stores this coefficient.

For the subsequent search operation the motor control circuit supplies a start pulse to a pulse shaper IF and a video control circuit VSt. The video control circuit VSt controls a video camera VK which radially scans the CD on the turntable PT over one picture line. The video camera VK supplies a digital output signal VD corresponding to the picture line. At the beginning of a search operation the motor control circuit supplies a suitable pulse to the pulse shaper IF, which again initiates picture-line scanning by the camera VK via the video control circuit VSt. The corresponding digital picture signal VD is read into a first digital picture-line memory V0, which is also controlled by the pulse shaper IF. Further, the digital picture-line memory V0 receives an enable signal from the video control circuit VSt when the output signal of the video camera is valid. In this way a line is stored in the video picture-line memory V0. Subsequently, the motor control circuit MSt supplies a stepping pulse SI to the stepping motor M. This stepping pulse SI is also applied to the video control circuit VSt and the angle counter WZ, to determine and store the angular setting. Now the Compact Disc is advanced by one position by means of the stepping motor M in response to the pulse SI. At the same time the video control circuit VSt receives the pulse SI, so that the video camera VK supplies a picture signal corresponding to the next picture line. This signal is applied to a correlator KOR, which also receives the enable signal applied to the picture-line memory V0. An input of the correlator KOR receives an output signal of the digital picture-line memory V0, which supplies the picture signal stored in the picture line memory V0. In the correlator KOR this signal and the instantaneous signal VD supplied by the video camera are compared with one another to determine the corresponding correlation coefficient. This operation is now repeated for all the other picture lines, which are compared with the picture line stored in the memory V0. For this purpose the motor control circuit supplies corresponding stepping pulses SI to the motor, the video control circuit VSt and the angle counter WZ.

Figure 2:
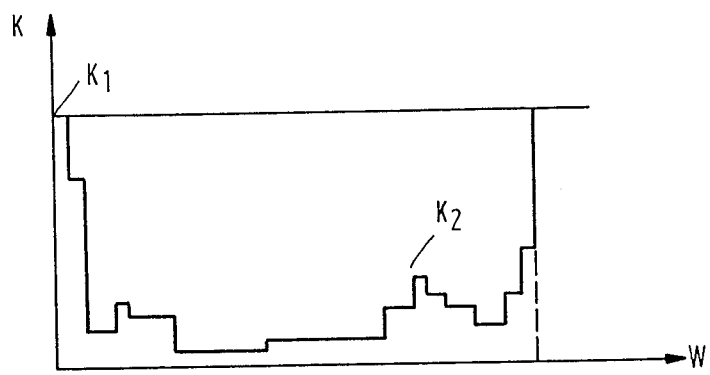
FIG. 2 shows the output signal of correlator KOR of FIG. 1.
Figure 3:
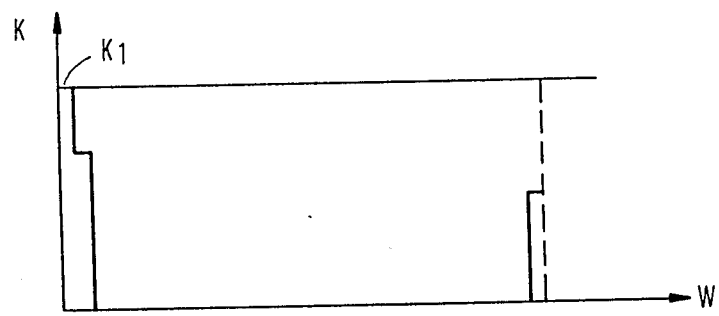
FIG. 3 shows a first output signal of the switch WE in the circuit of FIG. 1.

After a complete revolution of the Compact Disc the correlation coefficients of all the comparisons have successively appeared on the output of the correlator. This output signal of the correlator KOR is shown schematically in FIG. 2. These correlation coefficients are applied to a switch WE, which assigns them to a first output and a second output. The correlation coefficients produced when the comparison line is read into V0 and is compared in KOR, i.e., the coefficients obtained by comparison of the read-in line with itself, are applied to the first output. This coefficients have the value one. If desired, the correlation coefficients obtained by comparison of the stored picture line with the directly adjoining lines may also be applied to this output. FIG. 3 shows schematically an example of such an output signal on the first output of the switch WE. The picture line read into the picture-line memory V0 is subsequently compared with itself, so that the associated correlation coefficient is 1. Further, the correlation coefficients obtained by comparison of the line in V0 with the lines directly adjoining this line appear on this output of the switch WE. In the example illustrated on FIG. 3 the values of these two correlation coefficients are still comparatively large but differ from 1. All the other correlation coefficients obtained during comparison appear on a second output of the switch WE. These correlation coefficients, which appear on the second output of the switch WE during one revolution of the CD, are represented schematically in FIG. 4 for an arbitrarily chosen example.

Figure 4:
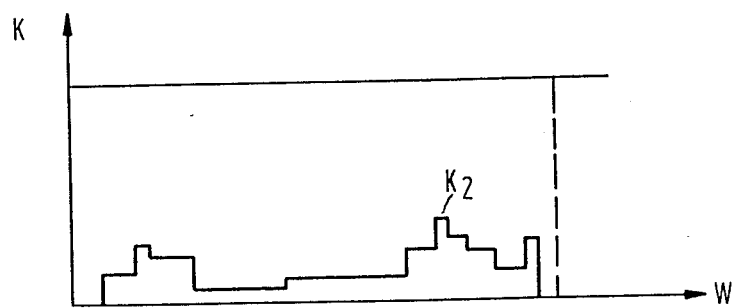
FIG. 4 shows a second output signal of the switch WE in the circuit of FIG. 1.

The maximal signal obtained on the first output of the switch WE during one revolution of the CD is stored in a first memory M1H and the maximal signal obtained on the second output of the switch WE during one comparison revolution of the CD is stored in a second memory M2H. In the example of FIG. 4 this value stored in M2H is K2, which is approximately 0.4 in the present example. The value stored in M1H is then K1 (FIG. 3), which is normally equal to 1. The stored values appear on the outputs of the two memories of M1H and M2H and can be further processed in a manner not shown in the drawing. For example, it is possible to form the quotient of these two signals for subsequently determining the alignment reliability.

All the correlation coefficients obtained during such a search revolution and successively appearing on the output of the correlator KOR are compared with the maximum correlation coefficients stored in the circuit KKS by means of a comparator KO. In the memory RAM all the storage locations corresponding to the picture lines which when compared with the picture line stored in V0 are found to have correlation coefficients exceeding the maximum correlation coefficient stored in KKS are rejected. The memory RAM is addressed by means of the angle counter WZ, which counts the stepping pulses SI and thus addresses the memory RAM at the storage location corresponding to the instantaneous picture line. Further, for each picture line for which a comparison with the picture line stored in V0 shows that the corresponding correlation coefficient lies below the nominal correlation coefficient stored in KKS, the corresponding position is stored in a reference-angle memory RWSp. For this purpose an input of the reference-angle memory RSWp receives a signal from the angle counter WZ, to provide an indication of the instantaneous position for the reference-angle memory RWSp. Moreover, a storage signal is applied to a second digital picture-line memory V1. On its input this picture-line memory V1 receives a signal VD from the video camera VK to store the picture signal of the corresponding picture line. This means that the picture-line memory V1 and the reference-angle memory RWSp store the picture content of a new picture line and the position of this line respectively each time that upon a comparison of this picture line with the picture line stored in V0 the associated correlation coefficient lies below the nominal correlation coefficient stored in KKS.

Further, at the end of a comparison revolution the circuit KKS determines whether the value stored in M2H lies below the maximum correlation coefficient. As the value stored in M2H is the largest correlation coefficient formed during comparison of the picture lines, the circuit KKS stores this value as the new nominal correlation coefficient if it is smaller than the nominal correlation coefficient stored until then.

Thus, after a search revolution of the CD all those locations in the memory RAM are erased for which a correlation coefficient larger than that stored in KKS is detected. However, if only smaller correlation coefficients are measured the nominal correlation coefficient in KKs is changed to the largest value measured.

After the first picture line stored in V0 has been compared with all the other picture lines in the manner described above, the next picture line is read into V0 and is similarly compared with all the other picture lines. However, now the RAM in addition supplies a signal to the pulse shaper IF if a picture line addressed in this memory has already been marked, i.e. if during a previous comparison its correlation coefficient for another picture line has already exceeded the maximum correlation coefficient stored in KKS. Correspondingly marked lines, for which the RAM supplies a signal to IF, are then no longer stored in V0 and compared with the other lines. Instead, the next line is scanned and stored in V0, but obviously this applies only if this line has not yet been marked as a rejected line in the RAM. Further, a picture line is continuously stored in V1 and its position in RWSp if, as described above, a comparison of this line with the picture line stored in V0 shows that it remains below the maximum correlation coefficient stored in KKS, which already may have been corrected downwardly.

These operations are repeated until finally the storage calls for all the picture lines in the memory RAM are rejected. The reference-angle memory RWSp then contains the angular position of the reference picture line with an optically characteristic picture content and this picture line itself is stored in the memory V1. Further, the memory M2H stores the maximal correlation coefficient of this picture line relative to one of the other picture lines. Thus, the desired reference picture line with an optically characteristic picture content is now found and both its picture content and its position relative to the nominal position of the CD are stored.

The values stored may be used for the subsequent alignment operations of CDs placed on the turntable PT These Compact Discs CD are now placed on the turntable PT in an arbitrary rotational position and should be rotated into the nominal position by means of the circuit arrangement.

Before an alignment process is started the signal SA is applied to the motor control circuit, which subsequently sets a switch US to a position A. In this position A the switch US connects an output of the second video memory V1 to the input of the correlator KOR. During the search operation, i.e. after application of the signal SS, the switch US is in the first position S, in which, as described above, the output of the picture-line memory V0 is connected to the input of the correlator KOR.

If now the alignment-enable signal FA is applied to the motor control circuit, the first CD is aligned. This is effected in such a way that the reference picture line with an optically characteristic picture content, which is stored in the picture memory V1, is compared with all the other picture lines in the correlator KOR. In principle this comparison proceeds in the same way as during the search operation, except that the picture line stored in the memory V0 is not compared with the other lines but with the picture line stored in V1. Ultimately at the end of a revolution the picture line with an optically characteristic picture content is compared with the reference picture line stored in V1 and, as a result of this, a corresponding correlation coefficient approximately equal to the one on the first output of the switch WE is read into the memory M1H. Once this has happened, the memory M1H supplies a corresponding signal to an alignment counter AZ. The alignment counter also receives the reference angle of the optically characteristic picture line as stored in the reference-angle memory. From these two angles the alignment counter determines where the set position is located by forming their difference. During a further revolution the alignment counter then supplies a stop pulse to the motor control circuit when this set position is reached. The alignment operation is thus completed and the motor control circuit supplies the "end-of-alignment" signal EA. In the search for the reference picture line with an optically characteristic picture content during comparison the largest correlation coefficient relative to the other picture lines is stored again. As this value has already been stored in the circuit SA during the search for the reference picture line with an optically characteristic picture content this stored value $K_{M2S}$ may be utilized for determining the alignment reliability. As is described above, the alignment reliability AS can be computed by means of the coefficient and two further correlation coefficients to be determined during alignment. When a predetermined value of the alignment reliability is not reached the circuit SA may supply a corresponding error signal to the motor control circuit, which again supplies the output signal FM to signal an error.

In the present embodiment the circuit arrangement serves for aligning Compact Discs in accordance with the orientation of the printing on their labels. However, a similar arrangement is also conceivable for other rotationally symmetrical objects to be aligned in a specific rotational position. The same applies to translatable objects which must be brought into a specific position. In that case it is also possible to use corresponding optical markings as indications for their positions and to effect positioning in accordance with the method.

It is even conceivable to use the method for detecting a fault condition. In the case of Compact Discs this would mean, for example, that a Compact Disc without any labelling or marking is scanned in conformity with the method. If the Compact Disc is without flaws no line with an optically characteristic picture content must be obtained. However, should such a picture line be obtained, this may be indicative an optically detectable error. How large this error may be depends on the magnitude of the predetermined nominal correlation coefficient. Error signalling is then effected when the nominal correlation coefficient is not attained.

What is claimed is:

1. A method for aligning at least one object to a set position comprising the steps of:
    (a) optically scanning the object line-by-line in order to obtain a plurality of picture lines having respective picture contents; and
    (b) detecting a reference picture line with an optically characteristic picture content, the detecting step including the steps of:
        (i) comparing the respective picture contents of substantially all picture lines with one another;
        (ii) first determining respective correlations between the respective picture contents of substantially each pair of picture lines;
        (iii) choosing as the reference picture line that picture line whose respective picture contents correlate least with the picture contents of the other lines; and
        (iv) second determining a position of the reference picture line necessary to achieve the set position; and
    (c) using the reference picture line as an indicator of a position of the object relative to the set position to align the object.

2. The method of claim 1 wherein the detecting step further comprises the steps of:
    storing for each picture line an associated set of correlation coefficients;
    selecting a largest correlation coefficients from each associated set; and
    choosing as the reference picture line that picture line whose largest correlation coefficient is smaller than the largest correlation coefficients of all the other picture lines.

3. The method of claim 2 wherein there are at least two objects, the method comprising the step of aligning at least one second object which aligning includes comparing picture contents of all picture lines of the second object with the reference picture line to identify the set position for the second object.

4. The method of claim 1 wherein the scanning step comprises:

(a) moving the object in a direction of motion; and
(b) optically scanning the object with a stationary video camera so that the picture lines are perpendicular to the direction of motion.

5. The method of claim 4 wherein the direction of motion is rotational, the picture lines are radial, and the set position is an angular position.

6. The method of claim 5 wherein the object is an optically readable disc-shaped information carrier.

7. The method of claim 4 wherein the object is translatable and the direction of motion is translational.

8. The method of claim 1 wherein
(a) the scanning step comprises:
   (i) first storing the respective picture content of each picture line; and
   (ii) second storing a relative position of each picture line;
(b) the first determining step comprises
   (i) generating a plurality of respective correlation coefficients measuring the respective correlations;
   (ii) third storing the respective correlation coefficients, so that for each picture line an associated set of correlation coefficients obtained by comparison with all other picture lines is stored; and
   (iii) identifying a respective largest correlation coefficient in each associated set; and
(c) the choosing step comprises fourth storing contents and relative position of a picture line whose respective largest coefficient is smaller than any other respective largest coefficient.

9. The method of claim 8 wherein
(a) the set position is an initial position of the at least one object;
(b) there are at least two objects;
(c) the using step comprises
   (i) second comparing the reference picture line with a picture content of an optically characteristic picture line of at least one second object;
   (ii) positioning the optically characteristic picture line in the position determined for the reference picture line in the second determining step.

10. The method of claim 9 comprising the further step of
selecting the optically characteristic picture line for the at least one second object according to the same method used for detecting the reference picture line.

11. The method of claim 10 comprising the further step of calculating, for each second object the following quotient (AS) as a measure of alignment reliability:

$$AS = \frac{K_A - K_{M2A}}{1 - K_{M2S}}$$

where
$K_a$ is an autocorrelation coefficient between the picture content of the optically characteristic picture line for the at least one second object and the reference picture line,
$K_{M2A}$ is a correlation coefficient between the reference picture line and a second picture line for the second object, which second picture line has a picture content which correlates most with the reference picture line when compared with all picture lines for the at least one second object, and
$K_{M2S}$ is a correlation coefficient between the reference picture line and a second picture line for the one object, which second picture line for the at least one object correlates most with the reference picture line when compared with all picture lines for the at least one object.

12. The method of claim 11 comprising the step of discontinuing aligning of the at least one second object if the measure (AS) of the alignment reliability falls below a predetermined value.

13. The method of claim 11 comprising the step of giving an error signal if the measure (AS) of the alignment reliability falls below a predetermined value.

14. The method of claim 1 wherein
(a) the scanning step comprises:
   (i) first storing the respective picture content of each picture line; and
   (ii) second storing a relative position of each picture line;
(b) the first determining step comprises
   (i) generating a plurality of respective correlation coefficients measuring the respective correlations;
   (ii) testing the respective correlation coefficients against a predetermined maximum nominal correlation coefficients;
   (iii) removing from consideration any pair of picture lines for which the respective correlation coefficient exceeds the predetermined maximum;
   (iv) third storing the respective correlation coefficients, so that for each non-rejected picture line an associated set of correlation coefficients obtained by comparison with all other picture lines is stored; and
   (v) identifying a respective largest correlation coefficient in each associated set; and
(c) the choosing step comprises fourth storing contents and relative position of a picture line whose respective largest coefficient is smaller than any other respective largest coefficient.

15. The method of claim 14 comprising the further step of
a. verifying whether the maximum correlation coefficient is larger than all of the correlation coefficients in one of the associated sets; and
b. changing the maximum correlation coefficient to the largest correlation coefficient in the one associated set if the verifying step gives a positive result.

16. The method of claim 15 comprising performing the verifying and changing steps with respect to at least a second one of the associated sets.

17. The method of claim 1 wherein, in the comparing and first determining step, pairs of adjacent picture lines are not considered.

18. The method of claim 1 wherein in the comparing and first determining step all pairs of picture lines are considered.

19. The method of claim 1 wherein the scanning step includes using a suitably selected color filter.

* * * * *